United States Patent

Hofmair et al.

Patent Number: 5,315,328
Date of Patent: May 24, 1994

[54] EYEGLASS FRAME

[75] Inventors: Herbert Hofmair, Linz; Gerhard Fuchs, Pasching, both of Austria

[73] Assignee: Silouette International Gesellschaft m.b.H., Linz, Austria

[21] Appl. No.: 64,735

[22] Filed: May 20, 1993

Related U.S. Application Data

[63] Continuation of Ser. No. 821,355, Jan. 15, 1992, abandoned.

[30] Foreign Application Priority Data

Jan. 17, 1991 [AT] Austria .................................. A97/91

[51] Int. Cl.5 ................................................. G02C 5/14
[52] U.S. Cl. ....................................... 351/121; 351/153
[58] Field of Search .................. 351/121, 153; 16/228; 2/450

[56] References Cited

U.S. PATENT DOCUMENTS 4,699,479 10/1987 Metcalf ............................... 351/153
5,035,499 7/1991 Kitamura et al. .................... 351/153

Primary Examiner—William L. Sikes
Assistant Examiner—Hung X. Dang
Attorney, Agent, or Firm—Collard & Roe

[57] ABSTRACT

A hinge connecting a bow (1) to a rim-side bow carrier (3) of a spectacle frame comprises is formed on said bow carrier (3) with an abutment surface, which faces the bow (1), which is formed with a pocket (7) that is open on the inside surface of the bow. The hinge bracket 5 is provided with stub pins, which constitute a pivot and are pivoted in bearing sockets (8) formed in the pocket (7). Grooves (9) extend from the bearing sockets, (8) to the inside surface of the bow and are tapered toward said bearing sockets (8) in depth or width so that the stub pins are a snap-action fit in the bearing sockets. To prevent an unintended separation of the bow from the bow carrier, the grooves extend from the bearing sockets on that side thereof which is opposite to a terminal edge (10), with which the bow engages the abutment surface (4) of the bow carrier (3) to define an open position for the bow.

2 Claims, 1 Drawing Sheet

EYEGLASS FRAME

CROSS-REFERENCE TO RELATED APPLICATION

This is a continuation of our copending application Ser. No. 07/821,355, filed Jan. 15, 1992 now abandoned.

BACKGROUND OF THE INVENTION

1. Field of the Invention

This invention relates to an eyeglass frame, particularly to a hinge connecting a bow to a bow carrier of an eyeglass rim, which hinge comprises a hinge bracket, which protrudes from the bow carrier on its abutment face facing the bow and extends into a pocket, which is formed in the bow and open on the inside surface of the bow, wherein said hinge bracket carries two stub pins, which constitute a pivot and within the pocket are pivoted as a snap-action fit in bearing sockets, and grooves for guiding the stub pins as they are inserted, which grooves extend from said bearing recesses to the inside surface of the bow.

2. Description of the Prior Art

In eyeglasses comprising plastic frames it is desired to form the rim-side hinge portions and the bow-side hinge portions integrally with the bow carriers and the bows, respectively, which are made of plastic. For that purpose it is known to provide the bow carrier with a hinge bracket, which carries upwardly and downwardly protruding stub pins, which constitute a pivot, and to provide in each bow a pocket for receiving the hinge bracket carried by the adjacent bow carrier. The stub pins of each hinge bracket extend into associated bearing sockets formed in the pocket of the associated bow. To permit the stub pins to be inserted into the bearing socket, the associated pocket is formed with grooves, which extend from the bearing recesses to that abutment face of the bow which faces the associated bow carrier and decrease in depth or width toward the bearing socket so that the stub pins will snap into the bearing sockets. That known design has the disadvantage that during an opening movement of the bow beyond a stop-defined open position, in which the bow is aligned with the rim-side hinge bracket, the stub pins formed on the rim-side hinge bracket will be forced out of the bearing sockets so that the bow will separate from the rim. Whereas the bow can subsequently be refitted on the rim-side hinge bracket until the stub pins again snap into the bearing recesses, the hinge will inevitably be worn out of the stub pins are repeatedly detached from the bow so that the proper use of the eyeglasses may no longer be possible.

SUMMARY OF THE INVENTION

It is an object of the invention to provide an eyeglass frame which is of the kind described first hereinbefore and in which the hinges are so designed that an undesired separation of the stub pins from the bows will be prevented by structurally simple means.

That object is accomplished in accordance with the invention in that the grooves extend from the bearing sockets on that side thereof which is opposite to the terminal edge with which the bow engages the abutment face of the adjacent bow carrier when the bow is in its stop-defined open position.

When the bow has been pivotally opened to the stop-defined position, in which a terminal edge of the bow engages the abutment face of the bow carrier, a fulcrum will be constituted by that terminal edge bearing on said abutment face and the bow can then be opened further about that fulcrum. Owing to that fact and to the fact that the grooves extend from the bearing sockets on that side thereof which is opposite to said terminal edge, the forces which during said further opening of the bow are exerted between the stub pins of the rim-side hinge bracket and the surfaces of the bearing sockets within the pocket of the bow will be transverse to the longitudinal direction of said grooves and there will be no substantial component of force in the longitudinal direction of the grooves so that forcing of the stub pins out of the bearing sockets will be prevented. The grooves extending as stated will define for the bow an angular position in which the stub pins can snap into and be forced out of the bearing sockets when the bow is intended to be attached to or detached from the rim and an undesired release of the stub pins from the bearing sockets will be rendered even more difficult.

Figure 1:
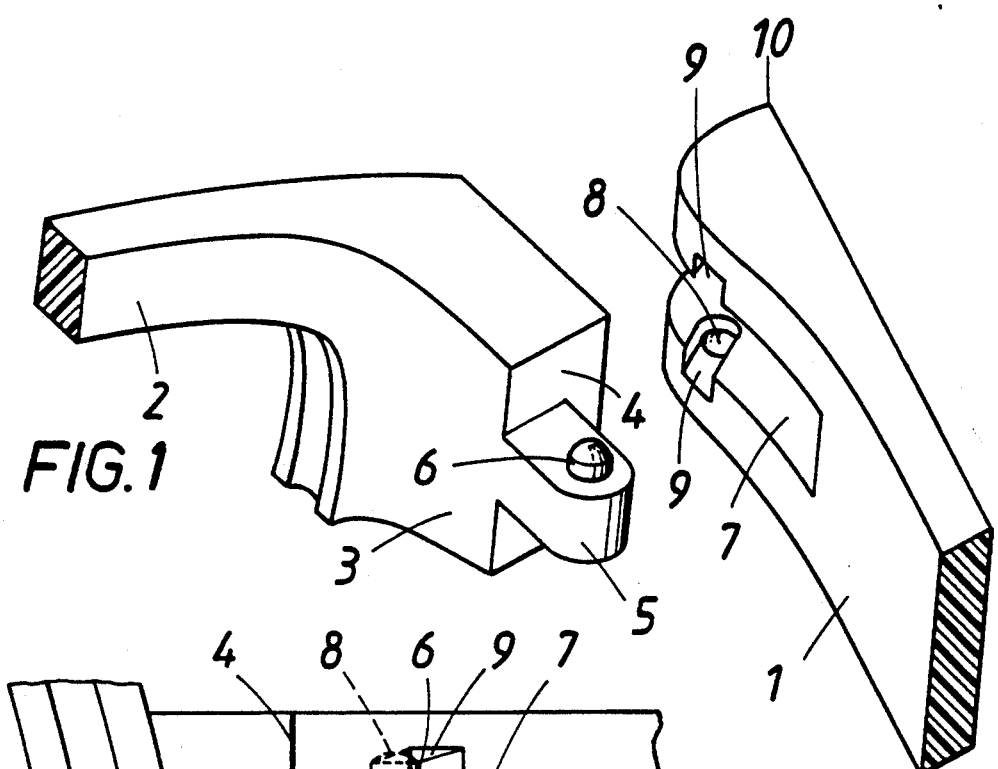
FIG. 1 is a simplified perspective view showing the unassembled parts of the hinge by which the bow is connected to the bow carrier.
Figure 2:
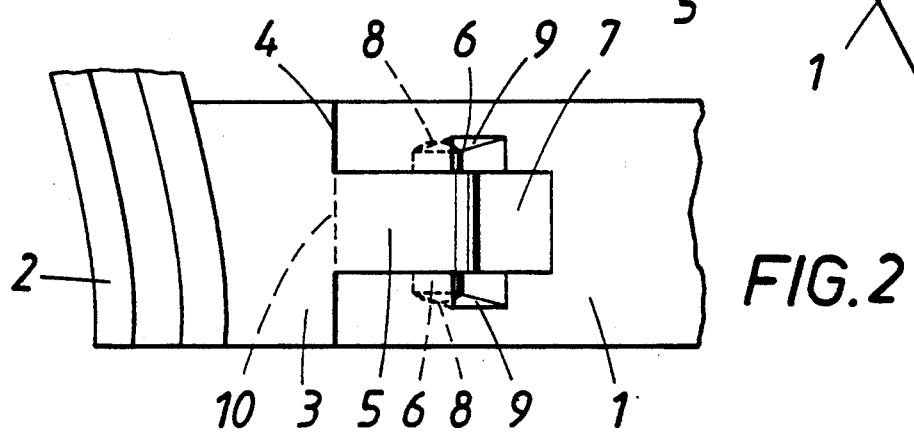
FIG. 2 is a side elevation showing such a hinge in a view on the inside surface of a bow.

To permit a bow 1 to be hinged to a rim 2 of an eyeglass frame, each of the bow carriers 3 provided on the rim 2 is provided with a hinge bracket 5, which protrudes from an abutment surface 4, with which the bow carrier 3 faces the bow 1. The hinge bracket 5 is provided with two stub pins 6, which constitute a pivot. The bow 1 is formed with a pocket 7 for receiving; the hinge bracket 5. The pocket 7 is open on the inside surface of the bow 1 and is formed with two coaxial bearing sockets 8, which are adapted to receive the stub pins 6 as a snap-action fit. To permit the stub pins 6 to be inserted into the bearing sockets 8, the inside surface of the pocket 7 is formed with grooves 9, which have a depth that decreases toward the bearing sockets 8 so that the stub pins can snap into the bearing sockets.

Figure 3:
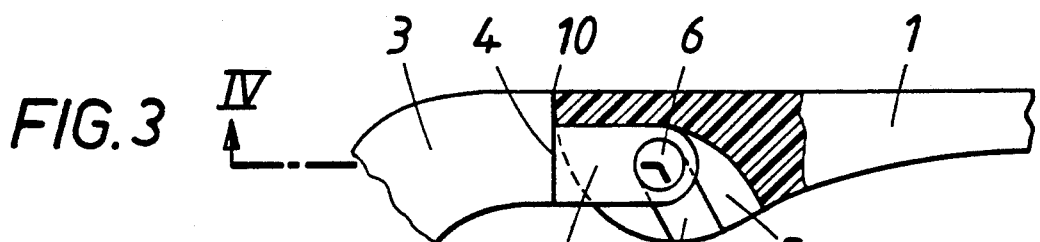
FIG. 3 is a top plan view showing the hinge partly torn open.
Figure 4:
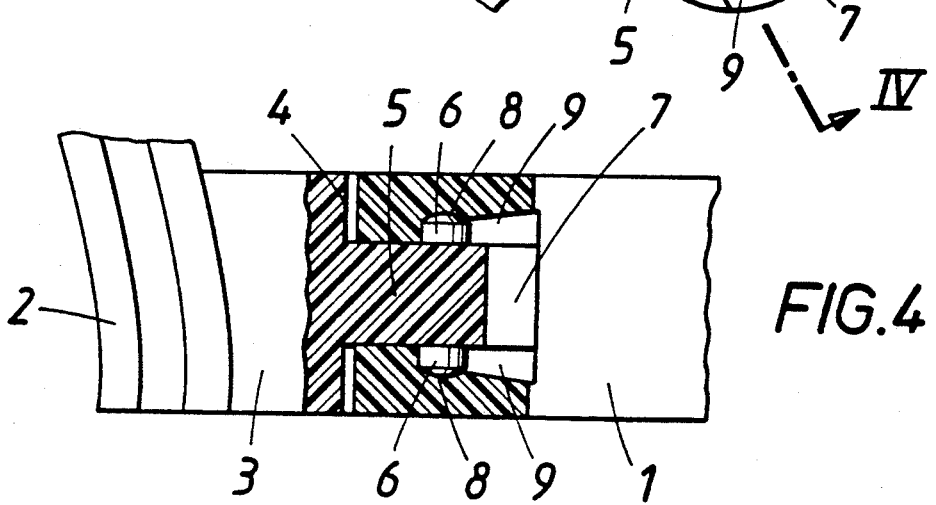
FIG. 4 is a sectional view taken on line IV—IV in FIG. 3.

Whereas in the conventional hinges of the same kind the grooves extend from the bearing sockets toward the abutment surface 4 of the bow carrier 3, in the present hinge the grooves 9 extend from the bearing sockets 8 on that side thereof which is opposite to the terminal edge 10 with which the bow in a stop-defined open position bears on the abutment surface 4 of the bow carrier 3, as is particularly apparent from FIGS. 1 and 3. When the bow 1 is opened beyond that stop-defined open position, a fulcrum for the bow will be constituted by the terminal edge 10 bearing on the abutment surface 4 rather than by the stub pins 6 so that the grooves 9 are then substantially radial to the new fulcrum and the stub pins 6 cannot possibly leave the bearing sockets 8 in the longitudinal direction of the grooves 9. As a result, the bow 1 cannot be separated from the bow carrier 3 by an opening movement beyond the stop-defined open position. For detaching the bow 1, the latter must be inturned from the stop-defined open position to a partly closed position, in which the grooves 9 are approximately parallel to the abutment surface 4 of the bow carrier 3, and the stub pins 6 can then be forced out of the bearing sockets 8 in a direction which is approximately parallel to the abutment surface 4 of the bow carrier 3.

Whereas the parts of the hinge which are illustrated can conveniently be made of plastic, it will be understood that the invention is not restricted to the use of plastic material for the parts of the hinge. It is sufficient to ensure that the stub pins 6 can snap into the bearing sockets 8. The snap action need not be ensured by grooves 9 which have a decreasing dimension in a direction which is parallel to the axis of the stub pins. A hinge having even smaller manufacturing tolerances will be obtained if the side faces of the grooves are formed with detent projections, by which the width of the groove is constricted to an extent which is smaller than the diameter of the stub pins, and said projections will retain the stub pins 6 in the bearing sockets 8 and must be overcome as the stub pins are inserted into and forced out of the bearing sockets.

We claim:

1. In an eyeglass frame comprising at each end a bow having an inside surface and an outside surface, said inside surface defining an open pocket formed with two coaxial bearing sockets and with grooves extending from said bearing sockets to said inside surface of said bow, the bearing socket being arranged intermediate the inside and outside surfaces to define a first side adjacent the inside surface and a second side opposite the first side with respect to the bearing sockets, said frame also comprising a rim, which has in association with each of said bows a bow carrier having an abutment surface facing the associated bow, which bow carrier is provided with a hinge bracket protruding from said abutment surface and provided on opposite sides with two coaxial stub pins pivotally received in a snap-action fit in respective ones of said bearing sockets, and wherein said outside surface of said bow has a terminal edge on the second side and said bow is pivotally movable to a stop-defined open position, in which said terminal edge bears on said abutment surface, and said bow is adapted to be opened beyond said stop-defined position about a fulcrum defined by said terminal edge bearing on said abutment surface, the improvement residing in that said grooves extend from said bearing sockets on the first side radially with respect to the fulcrum and at an acute angle with respect to said outside surface.

2. The improvement set forth in claim 1, wherein said grooves are arranged to be parallel to said abutment surface when said bow has been inturned from said stop-defined open position to a predetermined partly closed position.

* * * * *